INVENTORS.
JOSÉ ROSÁN SR.
ROBERT D. WEBER
BY
ATTORNEY

United States Patent Office 3,461,936
Patented Aug. 19, 1969

3,461,936
SELF-RETAINED TENSION NUT
José Rosán, Sr., Rancho San Juan, San Juan Capistrano, Calif. 92675, and Robert D. Weber, 1955 Irvine Ave., Costa Mesa, Calif. 92627
Filed Oct. 19, 1967, Ser. No. 676,570
Int. Cl. F16b *39/282, 39/284*
U.S. Cl. 151—41.72             5 Claims

ABSTRACT OF THE DISCLOSURE

This invention relates to press nuts capable of withstanding high tensional loads and which are mechanically locked in a workpiece against subsequent axial and rotational displacement relative thereto. The press nut of this invention is provided with a pilot flange which is longitudinally spaced from a radial broaching flange by an annular groove. About the periphery of the broaching flange are a plurality of serrations which are formed into cutting teeth at the forward ends thereof. By axially displacing the fastener into a workpiece bore, the serration teeth cut portions of the workpiece material and compact the same into an annular groove, thereby prohibiting further axial displacement of the fastener. The workpiece material situated in the interstices between the serrations produces a mechanical lock prohibiting rotational movement of the fastener. The fastener is also provided with an annular bearing flange which overlies the workpiece bore. The bearing flange not only insures the installation of the insert to a uniform depth, but also provides the bearing load capabilities of the fastener.

---

This invention relates to press nuts and more particularly, to press nuts capable of withstanding high tensile loads.

Although press nut fasteners have found increasingly greater acceptance in providing internally threaded insert elements, the amount of force (i.e., penetration load) required for the installation of the same has proven to be excessive relative to the axial load capacity thereof. This is due primarily to the fact that in currently utilized press nuts, the entire cross-sectional face of the locking flange must be deeply displaced or impacted into the workpiece, thereby requiring an excessive installation or penetration load. Since the locking flange (i.e., such as the serrated flange disclosed in my U.S. Patent No. 3,125,146) provides substantially all of the load carrying capability of the press nuts in current use, the tensile load capacity thereof is very limited.

Because of the limited axial load capacity of currently used press nuts and the location of the serration teeth about the periphery of the working flange thereof, with the advent of higher tensile strength bolts and the like, the tensile loads tend to equal or exceed the penetration load of the aforesaid press nuts and subsequently draw the press nuts through the workpiece thereby resulting in an unsatisfactory installation. Therefore, due to the foregoing factors, press nuts now in use cannot be utilized as structural fasteners.

These disadvantages are overcome by the fastener of the instant invention which provides a serrated locking flange between the pilot flange and an annular bearing flange in spaced relation therewith. By locating the serrations on the periphery of a nonload bearing flange having a diameter smaller than the diameter of a standard press nut so as to reduce the number of serrations about the flange periphery, and by providing a diameter across the serration roots which is less than the diameter of the workpiece counterbore so that the serrations cut rather than cold flow the workpiece material, the amount of serration and flange surface being resisted by the workpiece material during the axial displacement of the fastener therein when installing the same is decreased, thereby achieving a substantial reduction of penetration load required relative to a standard press nut.

As aforesaid, this serrated locking flange carries a negligible amount of tensile load applied to the fastener, since substantially all of said load is carried by the annular bearing flange. Thus, it has been found that not only does the fastener of this invention provide a very satisfactory structural fastener due to its high work load to penetration load factor, but also that the necessary penetration load is approximately three times less than that required for press nuts currently in use without sacrificing desirable "push-out" and "torque-out" characteristics. Therefore, not only does the instant invention provide sufficient "push-out" and "torque-out" capabilities, but requires only one-third the penetration load compared to press nuts now commonly used.

Accordingly, the principal object of the invention is to provide a simple fastener of inexpensive construction which is capable of withstanding high tensional loads as well as being locked in a workpiece against axial and rotational displacement.

Another object is to provide a simple fastener capable of withstanding high tensional loads and being locked in a workpiece against axial and rotational displacement which may be installed by simple tools.

Still another object is to provide a simple fastener of inexpensive construction capable of withstanding high tensional loads and being locked in a workpiece against axial and rotational displacement by forming a mechanical bond with said workpiece.

A further object is to provide a simple fastener capable of withstanding high tensional loads and resist axial and rotational displacement, which is securely locked to a workpiece by a mechanical lock formed by cutting and compacting a portion of the workpiece material.

Another object is to provide a simple fastener capable of withstanding high tensional loads and being locked in a workpiece against axial and rotational displacement in which a portion of the fastener is deformed during installation to provide a mechanical lock with the workpiece material.

Other objects and advantages will be readily apparent from the following description taken in conjunction with the accompanying drawings in which.

Figure 1:
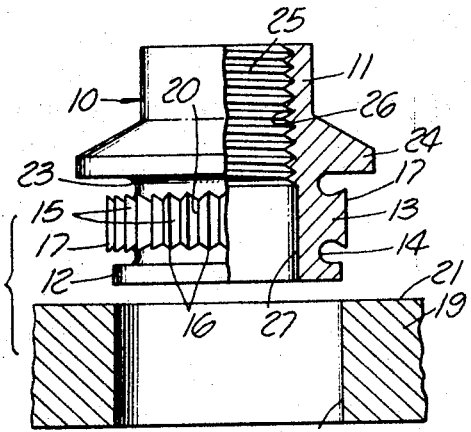
FIG. 1 is an elevational view, partly sectioned, of the fastener of the instant invention shown positioned above an accommodating bore in a workpiece.
Figure 3:
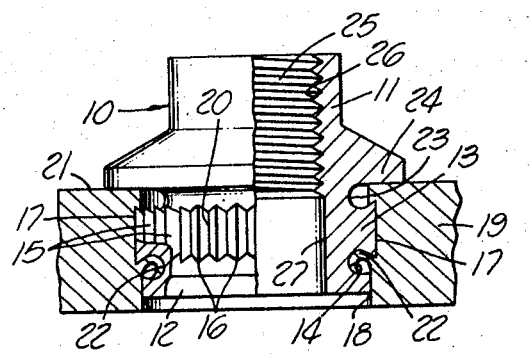
FIG. 3 is an elevational view, partly sectioned, of the fastener of FIG. 1 installed within the bore of the workpiece.
Figure 2:
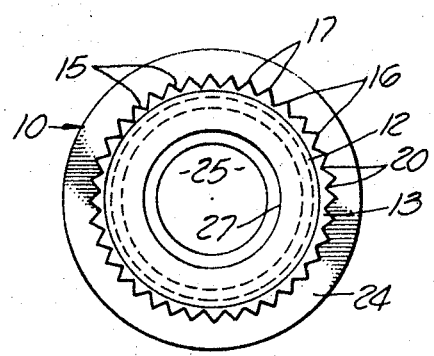
FIG. 2 is a bottom plan view of the fastener shown in FIG. 1.

Referring more particularly to FIGS. 1–3, reference numeral 10 generally designates the fastener of the instant invention. Fastener 10 is comprised of a body 11 provided with a radial pilot flange 12 and a broaching flange 13 axially spaced therefrom so as to produce an annular chip accommodating groove 14. Broaching flange 13 is provided with longitudinally extending serrations 15 positioned about the periphery thereof. Serrations 15 are preferably provided with downwardly projecting protrusion 16 on the bottom portion thereof so as to form teeth or the like.

It should be noted that the diameter of the broaching flange 13 across the serration crests 17 is greater than the diameter of the bore 18 of workpiece 19 and that the diameter of the broaching flange across serration roots 20 is less than the diameter of workpiece bore 18. Thus, upon the application of an axial force on fastener 10, pilot flange 12 engages the walls of the workpiece bore 18 and guides the fastener therein. During the axial displacement of fastener 10 into workpiece bore 18, serration teeth 16 positioned about broaching flange 13 bite into workpiece surface 21 thereby producing integral curls 22 of workpiece material which are then accommodated and compacted in annular groove 14. Because of the workpiece material (i.e., curls 22) which is compacted and maintained in annular groove 14, subsequent outward axial displacement of fastener 10 is prohibited.

It should be noted that since the roots 20 of serrations 15 have a diametric dimension less than that of the workpiece bore 18, they do not contact the workpiece material and accordingly do not interfere with the downward displacement of the fastener. From the particular configuration and dimensions of serrations 15, it should be evident that the aforesaid serrations act as a plurality of broaching tools which cut and compact the workpiece material into annular groove 14. Thus, a mechanical lock is produced whereby an annular ring of workpiece material integral with workpiece 19 overlies pilot flange 12 prohibiting the outward axial displacement of the fastener.

Obviously, upon the axial displacement of fastener 10 into workpiece bore 18 and the concomitant penetration of serrations 15 into workpiece 19, the uncut portions of said workpiece material 19 situated in the interstices between crests 17 of broaching flange serrations 15 create a mechanical lock which prevents subsequent rotational movement of the fastener relative to the workpiece. It is therefore evident that the coaction of the mechanical locks, i.e., the above described rotational lock, and the lock produced by the compaction of the workpiece material into the annular groove 14 of the fastener, provides a fastener positively secured to the workpiece such as to become an integral part thereof.

Longitudinally spaced from broaching flange 13 by annular groove 23 is bearing flange 24 which radially projects from body 11 of the fastener. Bearing flange 24 performs two functions; first it provides a means for installing the fastener to a uniform predetermined depth in the workpiece and second, after bearing flange 24 contacts workpiece surface 21, it acts as a bearing surface so as to prohibit subsequent axial displacement of the fastener into the workpiece. Thus, as a bolt or screw which is threaded into the fastener 10 is tightened, the tensile load produced thereby does not draw the fastener through the workpiece, but rather the fastener, by virtue of bearing flange 24, abuts against workpiece surface 21 and restricts any subsequent downward displacement thereof.

It should be noted that when fastener teeth are driven into a workpiece, atypically the surface around the workpiece bore, particularly at the interstices between the teeth, bulges outwardly. This prevents the fastener from seating flush against the surface of the workpiece. Therefore, the annular groove 23 situated between the broaching and bearing flanges serves two functions. When the fastener 10 is installed, the bearing flange 24 is forced against the surface bulge or bulges around the edge of the workpiece bore. The material constituting the bulge or bulges is displaced into the groove 23 and is accommodated therein, thereby permitting the fastener to seat flush against the workpiece surface 21. Further, during this operation the portion of the material which had previously formed the bulge or bulges is displaced so as to overlap the top of the serrations 15, thereby increasing the "push-out" resistance of the installed fastener. Fastener 10 is provided with internal bore 25 having a threaded portion 26 and a smooth nonthreaded counterbore 27. It should be noted that although counterbore 27 may be of any longitudinal dimension without deviating from the scope of the invention herein, it preferably has a longitudinal dimension sufficient to preclude internal threads in the area of body 11 adjacent broaching flange 13 and extending to the end of the fastener adjacent pilot flange 12. Thus, upon the application of a tension load on the internal threads by a screw or bolt threaded therein, load stresses in the fastener body opposite the workpiece securing portion of the fastener are avoided, thereby eliminating cracking and distortion of the fastener in this area.

Figure 4:
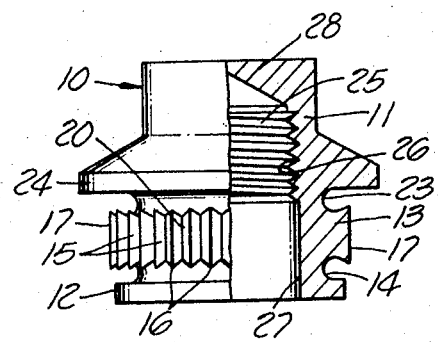
FIG. 4 is an elevational view, partly in section, of another embodiment of the invention wherein the threaded cavity therein does not extend through the fastener body.

The fastener illustrated in FIG. 4 illustrates another embodiment of the invention wherein dome portion 28 formed by body 11 completely encloses internal bore 25. In all other respects, however, it is similar to the fastener of FIGS. 1–3, and accordingly, the same reference numerals designate similar elements thereof. This embodiment is particularly useful when a leak-proof installation of a fastener is desired so as to prohibit fluid or the like from escaping through the workpiece bore along the helical path of the internal threads of the fastener as commonly occurs even with a screw or bolt being in threaded engagement with the fastener threads.

Figure 5:
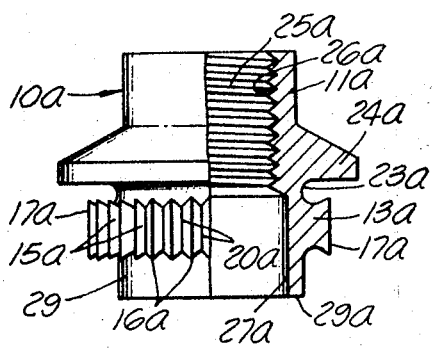
FIG. 5 is an elevational view, partly sectioned, illustrating still another embodiment of the invention showing the fastener provided with a cylindrical skirt which is subsequently rolled to form a radial flange thereby producing a chip accommodating groove and providing means for prohibiting outward axial displacement of the fastener.
Figure 6:
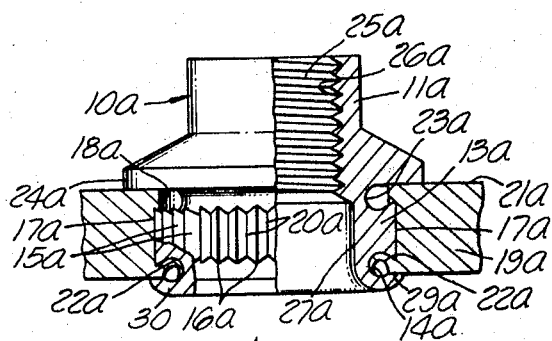
FIG. 6 is an elevational view, partly in section, showing the insert of FIG. 5 installed in a workpiece bore illustrating the fastener skirt rolled into tight accommodation with the underside of the workpiece surface and thereby, in conjunction with the broaching flange, producing a chip accommodating groove.

FIGS. 5 and 6 illustrate still another embodiment of the invention wherein the fastener 10a is not initially provided with a pilot flange (such as pilot flange 12 in FIGS. 1–4), but rather has a longitudinally extending skirt 29 which guides the fastener into the workpiece bore 18a upon the axial displacement thereof during the installation of the fastener into the workpiece 19a. Simultaneously with the downward displacement of the fastener, the end portion 29a of skirt 29 is flared or expanded radially away from the axis of the fastener by the use of an appropriate tool (not shown), thereby producing a chip accommodating groove 14a and a retaining flange 30. Thus, while bearing flange 24a abutting against workpiece surface 21a prohibits subsequent axial displacement in one direction, the newly formed retention flange 30 in conjunction with the compacted workpiece curls 22a formed by the cutting action of teeth 16a of serrations 15a provided by broaching flange 13a prohibit subsequent axial displacement in the opposite direction. It should be noted that the abutment of end portion 29a of retention flange 30 against the underside of workpiece 19a provides further resistance to the outward displacement of the fastener. In all other respects the elements of FIGS. 5 and 6 are similar to the embodiments of FIGS. 1–3 and perform substantially similar thereto.

While several embodiments of the invention have been described, it is understood that the particular embodiments of the invention herein disclosed are for illustrative purposes only.

What is claimed is:
1. A fastener capable of supporting tensile loads for securement in a bore in a workpiece, comprising:
 a body, said body being provided with an axial bore extending therethrough having internal threads therein;
 a bearing flange radially projecting from said body, said bearing flange having a diameter greater than that of the accommodating workpiece bore;
 a broaching flange radially projecting from said body, said broaching flange provided with a plurality of cutting serrations positioned about the periphery thereof, said broaching flange being spatially positioned relative to said bearing flange by a first annular groove, said groove being formed by the bottom surface of the bearing flange and the top surface of the broaching flange, the base of said groove being radially inwardly disposed relative to the roots of the serrations carried by the broaching flange;

a radial pilot flange projecting from said body and having a diameter less than the diameter of the workpiece bore, said pilot flange being longitudinally spaced from said broaching flange by a second annular groove, said groove being formed by the bottom surface of the broaching flange and the top surface of the pilot flange, the base of said groove being radially inwardly disposed relative to the roots of the serrations carried by the broaching flange; and an interval smooth walled counterbore concentrically positioned relative to the axial bore of the body, said counterbore extending axially outwardly from opposite the first annular groove to the end of said body.

2. A fastener capable of supporting tensile loads as described in claim 1, wherein said cutting serrations are comprised of longitudinal serrations having downwardly extending cutting points on the forward edges thereof.

3. A fastener capable of supporting tensile loads as described in claim 2, wherein the maximum diameter across the serration roots does not exceed the minimum diameter of the workpiece bore, and the minimum diameter across the serration crests is greater than the maximum diameter of the workpiece bore.

4. A fastener capable of supporting tensile loads as described in claim 2, wherein said body is enclosed at the end thereof opposite the body end adjacent the pilot flange.

5. A fastener capable of supporting tensile loads as described in claim 2, wherein the annular groove is formed by the lower surface of the broaching flange and the upper surface of a retention flange formed by the rolled edge of the body simultaneously with the axial displacement of the fastener during the installation thereof.

References Cited

UNITED STATES PATENTS

| | | | |
|---|---|---|---|
| 1,112,525 | 10/1914 | Darling | 151—41.73 |
| 1,946,065 | 2/1934 | Dodge | 151—41.73 |
| 2,026,757 | 1/1936 | Swanstrom | 151—41.72 |
| 2,358,728 | 9/1944 | Miller | 151—41.73 |
| 2,685,320 | 8/1954 | Rosan | 151—41.73 |
| 3,078,754 | 2/1963 | DeLacy | 151—41.73 |
| 3,079,970 | 3/1963 | Barry | 151—41.73 |
| 3,137,336 | 6/1964 | Wing | 151—41.73 |

FOREIGN PATENTS

| | | |
|---|---|---|
| 690,252 | 4/1953 | Great Britain. |
| 938,936 | 10/1963 | Great Britain. |

OTHER REFERENCES

SPS publication from Machine Design, copy in 151—41.73.

MARION PARSONS, JR., Primary Examiner

U.S. Cl. X.R.

151—41.73